US010992444B2

(12) United States Patent
Cox

(10) Patent No.: US 10,992,444 B2
(45) Date of Patent: Apr. 27, 2021

(54) FULL-DUPLEX COMMUNICATIONS SYSTEM

(71) Applicant: Photonic Systems, Inc., Billerica, MA (US)

(72) Inventor: Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 16/342,189

(22) PCT Filed: Oct. 17, 2017

(86) PCT No.: PCT/US2017/057058
§ 371 (c)(1),
(2) Date: Apr. 15, 2019

(87) PCT Pub. No.: WO2018/075569
PCT Pub. Date: Apr. 26, 2018

(65) Prior Publication Data
US 2019/0327067 A1    Oct. 24, 2019

Related U.S. Application Data

(60) Provisional application No. 62/409,898, filed on Oct. 19, 2016, provisional application No. 62/409,835, filed on Oct. 18, 2016.

(51) Int. Cl.
*H04L 5/14* (2006.01)
*H04B 7/26* (2006.01)

(52) U.S. Cl.
CPC ............ *H04L 5/14* (2013.01); *H04B 7/2621* (2013.01)

(58) Field of Classification Search
CPC combination set(s) only.
See application file for complete search history.

(56) References Cited

U.S. PATENT DOCUMENTS 6,259,933 B1 * 7/2001 Bambridge ............. H01Q 1/02
                                                343/702
9,735,940 B1 * 8/2017 Bakr ..................... H04L 5/0053
(Continued)

FOREIGN PATENT DOCUMENTS

WO    2015134907 A1    9/2015

OTHER PUBLICATIONS

"Notification of Transmittal of the International Search Report and the Written Opinion of the International Searching Authority, or the Declaration" for International Patent Application No. PCT/US2017/057058, dated Jan. 25, 2018, 11 pages, The International Searching Authority/KR, Daejeon, Republic of Korea.
(Continued)

*Primary Examiner* — Xavier S Wong
(74) *Attorney, Agent, or Firm* — Rauschenbach Patent Law Group, LLC; Kurt Rauschenbach

(57) ABSTRACT

A method of full-duplex cellular communications includes receiving a first signal transmitted by a first cellular device at a base station using a cellular uplink frequency in a cellular frequency band. A second signal is transmitted from the base station to the first cellular device using a cellular downlink frequency in the cellular frequency band simultaneously with the receiving the first signal transmitted by the first cellular device. A third signal is transmitted from the base station to a second cellular device using the cellular uplink frequency in the cellular frequency band simultaneously with the receiving the first signal transmitted by the first cellular device and simultaneously with the transmitting the second signal from the base station to the first cellular device.

16 Claims, 5 Drawing Sheets

(56) References Cited

U.S. PATENT DOCUMENTS

| | | | |
|---|---|---|---|
| 2006/0002323 A1* | 1/2006 | Hildebrand | H04B 7/2618 |
| | | | 370/321 |
| 2007/0085754 A1* | 4/2007 | Ella | H04B 1/0458 |
| | | | 343/862 |
| 2009/0191833 A1* | 7/2009 | Kaczman | H03F 3/211 |
| | | | 455/296 |
| 2013/0188530 A1* | 7/2013 | Pirskanen | H04W 72/0453 |
| | | | 370/280 |
| 2013/0194984 A1 | 8/2013 | Cheng et al. | |
| 2015/0109969 A1 | 4/2015 | Celebi et al. | |
| 2015/0280887 A1* | 10/2015 | Ko | H04B 1/525 |
| | | | 370/330 |
| 2015/0372799 A1 | 12/2015 | Moher | |
| 2016/0013548 A1 | 1/2016 | Park et al. | |
| 2016/0081091 A1 | 3/2016 | Kim et al. | |

OTHER PUBLICATIONS

"Notification Concerning Transmittal of the International Preliminary Report on Patentability (Chapter I of the Patent Cooperation Treaty)" for International Patent Application No. PCT/US2017/057058, dated May 2, 2019, 8 pages, The International Bureau of WIPO, Geneva, Switzerland.

"Supplementary European Search Report" for European Patent Application No. 17862976.2, dated May 18, 2020, 9 pages, European Patent Office, Munich, Germany.

* cited by examiner

FULL-DUPLEX COMMUNICATIONS SYSTEM

CROSS-REFERENCE TO RELATED APPLICATION

The present application is a 35 U.S.C. § 371 application based on International Patent Application No. PCT/US17/57058, filed on Oct. 17, 2017, entitled "Full-Duplex Communications System" which claims priority to U.S. Provisional Patent Application Ser. No. 62/409,835, filed Oct. 18, 2016, entitled "Single-Channel, Full-Duplex Communications System" and claims priority to U.S. Provisional Patent Application Ser. No. 62/409,898, filed Oct. 19, 2016, entitled "Single-Channel, Full-Duplex Communications System". The entire disclosures of International Patent Application No. PCT/US17/57058 and U.S. Provisional Patent Application Ser. Nos. 62/409,835 and 62/409,898 are incorporated herein by reference.

The section headings used herein are for organizational purposes only and should not to be construed as limiting the subject matter described in the present application in any way.

INTRODUCTION

Full-duplex communications systems are presently receiving a lot of attention. One of the driving reasons behind full-duplex is the potential to double the spectrum efficiency, i.e. doubling the amount of bi-directional information that can be conveyed over a given bandwidth of spectrum. Increased spectrum efficiency is important because the increased demands for spectrum are driving an exponential growth in the price of spectrum. There is, of course, a limited and fixed amount of the electromagnetic spectrum available and it is expected that there will an ever increasing demand.

However, implementing full-duplex involves a substantial investment. Consider the case of implementing full-duplex in a cellular mobile telephone system. The hardware that enables full-duplex needs to be added to both the base station and to each of the cell (mobile) phones. In addition, signal processing, in both the analog and the digital domains, is needed in every cell phone to suppress the uplink (cell phone-to-base station) signals received at a particular phone that are emitted by the cell phones of users that are co-located with that particular phone. Modifications to cell phones can be quite expensive, since considerable effort is needed to reduce the size and production cost of the hardware. Furthermore, every cell phone served by an full-duplex-equipped base station must be equipped with the necessary full-duplex hardware and signal processing.

A second concern with introducing full-duplex arises when the portion of the spectrum into which full-duplex is to be introduced already has cell phones operating. Clearly the addition of full-duplex must not impact the operation of these so called "legacy users". Thus, there is also a very substantial demand for full-duplex hardware and method of operating full-duplex hardware that can be introduced into portions of the spectrum in which there are legacy users without impacting the operation of these legacy users.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The substantial costs of designing hardware for, and equipping cell phones with, full-duplex hardware could be eliminated if it were possible to design an full-duplex system in which full-duplex hardware was only required at the base stations. Thus, there is a very substantial demand for methods and apparatus where full-duplex hardware is only required at the base stations.

The present teaching relates to methods and apparatus that meet the dual objective of (1) providing the benefits of full-duplex to new users that is compatible with legacy users; and (2) only requiring hardware significant modifications to the base station. As usual, when imposing constraints on an engineering design, there are tradeoffs between the particular constraints and the performance that can be realized under those constraints. One aspect of the method and apparatus of the present teaching is providing a mobile cellular communication system where these constraints can be met with the tradeoff that the increase in spectrum efficiency is limited to 1.5×, vs the 2× increase that can be realized with unconstrained full-duplex communications. However, the increase in spectrum efficiency is realized via a doubling of the down-link spectrum. The down-link spectrum is the link in mobile cellular systems that is under the greater bandwidth pressure due to the commercial desire to download videos and/or stream videos.

Figure 1:
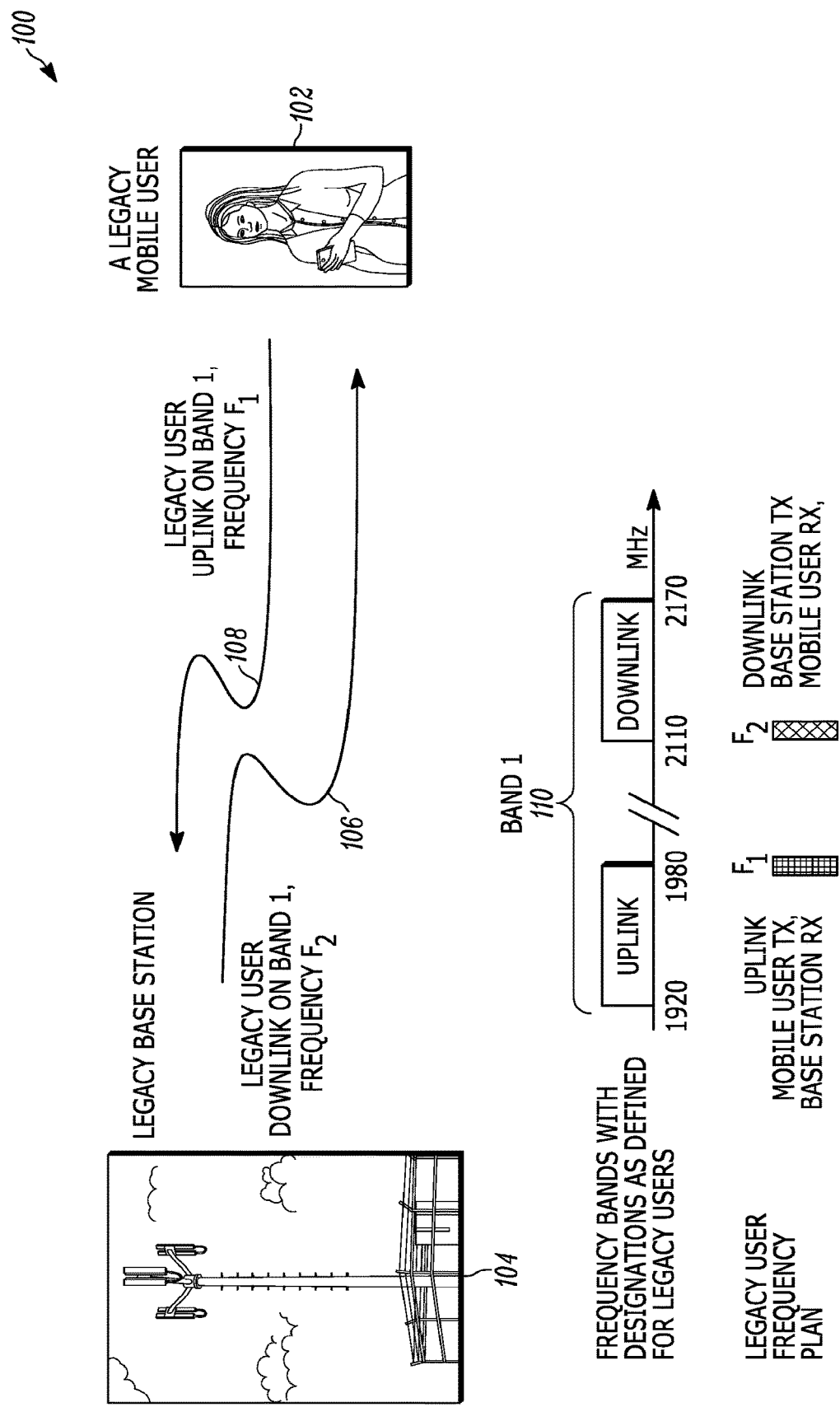
FIG. 1 illustrates a configuration of a conventional cellular mobile telephone system that uses frequency division duplexing (FDD).

FIG. 1 illustrates a configuration of a conventional cellular mobile telephone system 100 that uses frequency division duplexing (FDD). The top half of FIG. 1 shows a legacy mobile user 102 that is connected to a legacy base station 104, via a pair of links between the legacy mobile user 102 and the base station 104: a downlink 106 from the legacy base station 104 to the legacy user 102 and an uplink 108 from the legacy mobile user 102 to the legacy base station 104. Since we are assuming that the communication protocol uses frequency division duplexing (FDD), the uplink 108 and downlink 106 are necessarily in different frequency bands. The frequency bands 110 are shown in the lower half of FIG. 1. The specific frequency ranges of the uplink 108 and downlink 106 are those for Band 1 of the wireless standard. In this example, the uplink 108 is operating at a frequency F1, which is between 1920 and 1980 MHz; and the downlink 106 is operating at a frequency F2, which is between 2110 and 2170 MHz.

For implementing an unconstrained version of full-duplex, the link frequency assignments of a second user would be just the opposite of those of the first user. That is, the second user's downlink would be on frequency F1 and the second user's uplink would be on frequency F2. Since both frequency F1 and frequency F2 are each carrying double the number of signals as compared to a legacy system without full-duplex capability, the improvement in spectrum efficiency would be 2×.

To put the methods and apparatus of the present teaching in context, we first explore the issues that arise if one were to use a straight forward implementation of full-duplex at the base station only. The base station is equipped with hardware that enables full-duplex. For example, suitable hardware has been disclosed in U.S. patent application Ser. Nos. 13/844,180 and 14/417,122, entitled "Same-Aperture Any-Frequency Simultaneous Transmit and Receive Communication". The entire contents of U.S. patent application Ser. Nos. 13/844,180 and 14/417,122, which are assigned to the present assignee, are herein incorporated by reference. Implementing no hardware addition and/or modification to the mobile cell phone has various problems.

Figure 2:
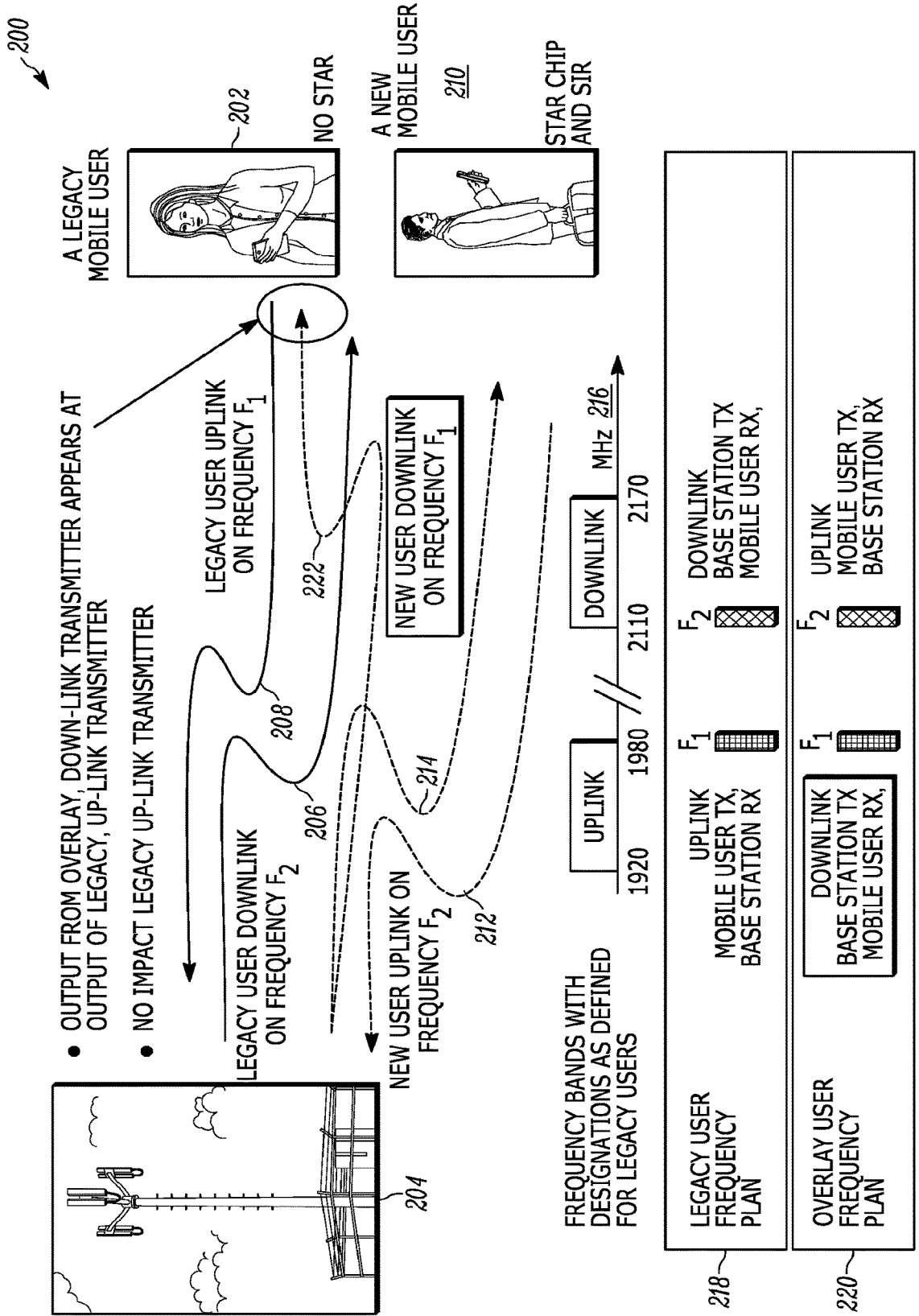
FIG. 2 illustrates a configuration showing the potential impact of implementing full-duplex at the base station only, with no modification to the mobile cell phone, on the down-link operation.

FIG. 2 illustrates a configuration 200 showing the potential impact of implementing full-duplex at the base station only, with no modification to the mobile cell phone, on the down-link operation. The configuration 200 shows a mobile user 202 and a full duplex-equipped base station 204 with a legacy user downlink 206 and a legacy user uplink 208, a new user 210 is also shown with a corresponding new user uplink 212 and new user downlink 214.

The uplink and downlink frequency bands 216 for the legacy users are shown as well as the legacy user frequency plan 218. An overlay user frequency plan 220 of the down-link operation is shown in which one overlays the new downlink signal using the same frequency that the legacy user uses for the uplink. The output from the overlay downlink transmitter 222 appears at the output of legacy up-link transmitter. However, as is well known in the transmitter art, the outputs of transmitters are designed to withstand large signals at their outputs, which can occur, for example, in regular operation when a portion of the transmit power is reflected by the antenna back to the transmitter. Hence, full-duplex for the downlink does not impact the legacy user.

Figure 3:
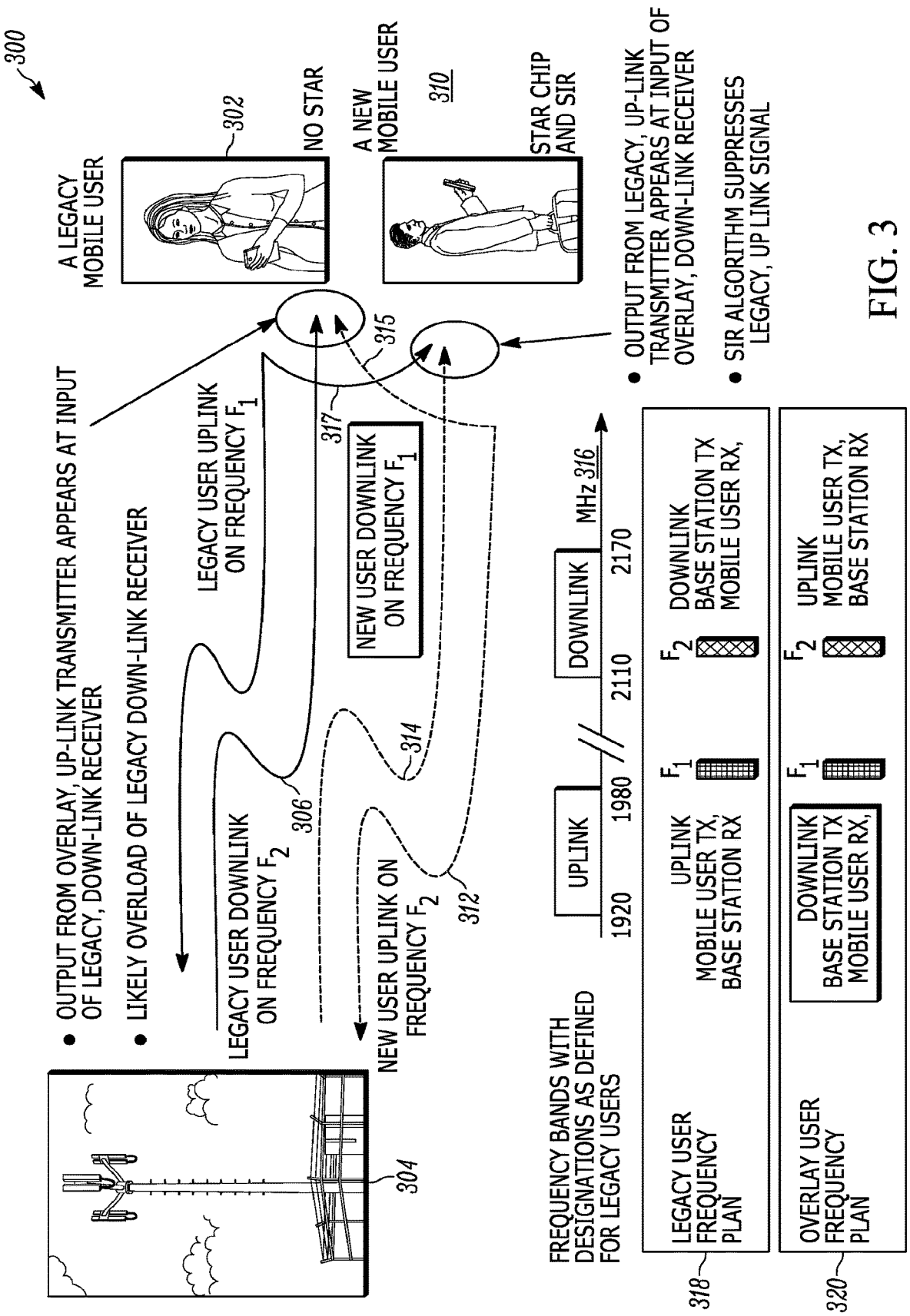
FIG. 3 illustrates a configuration showing the potential impact of full-duplex on legacy users, with no modification to the mobile cell phone, with overlay up-link operation.

FIG. 3 illustrates a configuration 300 showing the potential impact of full-duplex on legacy users, with no modification to the mobile cell phone, with overlay up-link operation. The configuration 300 shows a mobile user 302 and a full duplex-equipped base station 304 with a legacy user downlink 306 on frequency F2 and a legacy user uplink 308 on frequency F1. A new user 310 is also shown with a corresponding new user uplink 312 on frequency F2 and new user downlink 314 at frequency F1. The output 315 from the overlay up-link transmitter appears at the input of legacy down-link receiver.

The uplink and downlink frequency bands 316 for the legacy users are shown as well as the legacy user frequency plan 318. An overlay user frequency plan 320 is shown in which one overlays the new user downlink signal using the same frequency that the legacy user uses for the uplink and overlays the new user uplink signal using the same frequency that the legacy user uses for the downlink. In this case, the new user's 310 uplink signal 315 would pass through the legacy user's 302 duplexer which would route the signal to the input of the legacy user's 302 receiver, the first active stage of which is typically a low noise amplifier (LNA). Similarly the legacy user's 302 uplink signal 317 would pass through the new user's 310 duplexer which would route the signal to the input of the new user's 310 receiver, the first active stage of which is typically a low noise amplifier (LNA). As is well known by those knowledgeable in the receiver art, a large signal at the input of the sensitive LNA causes a variety of technical issues depending on how much the large signal overloads the LNA. The technical issues range from causing distortion for moderately large signals, to driving the LNA into compression for larger signals, to burning out the LNA for extremely large signals. Any of these technical issues would render the LNA unable to receive the desired signal with sufficient fidelity to enable decoding the waveform with sufficiently low bit error rate. Thus, there is the potential for interference caused by the uplink transmissions from the both the new and legacy users on the receivers of the legacy and new users, respectively. A method has been developed for suppressing such interference. See, for example, U.S. patent application Ser. No. 14/920,740 entitled "An RF Signal Separation And Suppression System And Method", which is assigned the present assignee and which is incorporated herein by reference. This method, which can be implemented as an algorithm in software, could be possibly be downloaded into the legacy user's phone. The new user's phone could have the algorithm installed at manufacture or be downloaded after manufacture.

The configuration 300 will likely result in an overload of the legacy down-link receiver. As is well known by those knowledgeable in the receiver art, a large signal at the input of the sensitive receiver causes a variety of technical issues depending on how much the large signal overloads the receiver. The technical issues range from causing distortion for moderately large signals, to driving the receiver into compression for larger signals, to burning out the receiver for extremely large signals. Any of these technical issues would render the receiver unable to receive the desired signal with sufficient fidelity to enable decoding the waveform with a sufficiently low bit error rate for a commercial communications system. Consequently, it is difficult to implement full-duplex at the base station only on the uplink side using the conventional approach without modifying the cell phone hardware and/or software, which is relatively difficult and costly compared to implementing full-duplex only at the base station.

Figure 4:
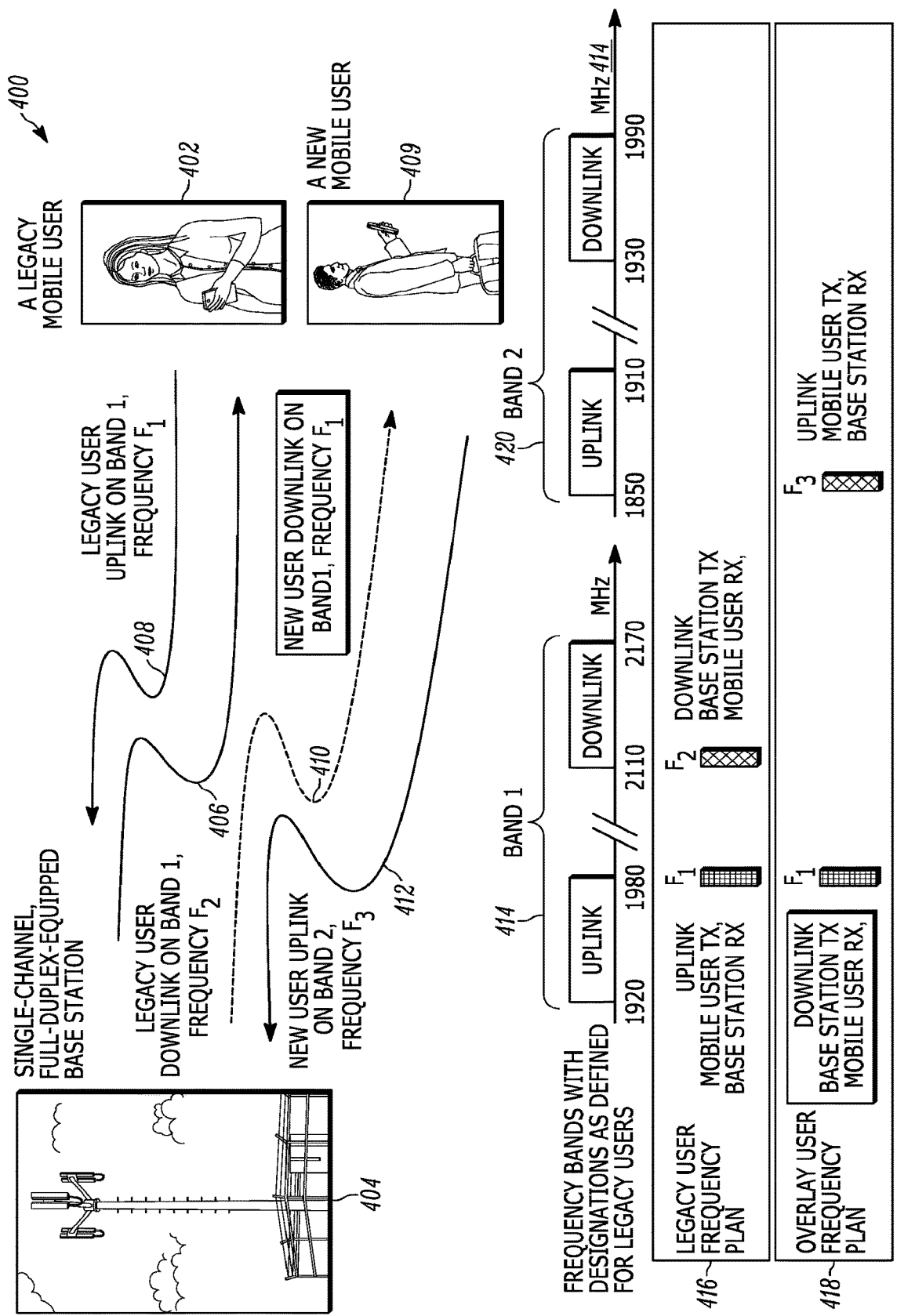
FIG. 4 illustrates a configuration of a full-duplex communications system according to the present teaching that has been shown to operate simultaneously with new cellular mobile telephone users without interfering with legacy cellular mobile telephone system users.

FIG. 4 illustrates a configuration 400 of a full-duplex communications system according to the present teaching that has been shown to operate simultaneously with new cellular mobile telephone users without interfering with legacy cellular mobile telephone system users. The configuration 400 of FIG. 4 makes frequency assignments that enable doubling the usage of frequency F1 while avoiding the need for any new hardware in the mobile cell phone, which in turn, permits the full-duplex to be compatible with legacy mobile users. The method and apparatus implementing the configuration 400 have the obvious advantage of greatly lowering the cost of implementing full-duplex.

The configuration 400 shows a mobile user 402 and a full duplex-equipped base station 404 with a legacy user downlink 406 on Band 1, frequency F2 and a legacy user uplink 408 on Band 1 frequency F1. The new user 409 receives his downlink signal 410 from the base station on Band 1, frequency F1, which is the same frequency channel used by the legacy mobile user 402 to transmit her uplink signal 408 to the base station 404. Of course, the downlink 410 to the new user 409 passes through the duplexer on the legacy user's 402 phone which routes the signal to the output of the legacy user's 402 transmitter, which is amplified by the power amplifier. It is well known in the art that power amplifiers can withstand relatively large signals at their outputs, which can occur, for example, in regular operation when a portion of the transmit power is reflected by the antenna back to the power amplifier.

However, as described in connection with FIG. 3, a different situation would occur if one were to attempt to send the uplink signal from the new user 409 which is on the same frequency that is used by the legacy user 402 to receive the downlink from the base station 404. In this case the new user's 409 uplink signal 412 would pass through the legacy user's 402 duplexer which would route the signal to the input of the legacy user's 402 receiver, the first active stage of which is typically a low noise amplifier (LNA). As is well known by those knowledgeable in the receiver art, a large signal at the input of the sensitive LNA causes a variety of technical issues depending on how much the large signal overloads the LNA. The technical issues range from causing distortion for moderately large signals, to driving the LNA into compression for larger signals, to burning out the LNA for extremely large signals. Any of these technical issues would render the LNA unable to receive the desired signal with sufficient fidelity to enable decoding the waveform with sufficiently low bit error rate.

One aspect of the present teaching is the realization that these technical issues can be resolved by using a carrier in a different frequency band to convey the new user's 409 uplink signal 412 as shown in the configuration of FIG. 4. The uplink and downlink frequency band 414 (Band 1) for the legacy users are shown. Also, the legacy user frequency plan 416 is shown. An overlay user frequency plan 418 of the down-link operation is shown in which one overlays the new downlink signal using the same frequency in Band 1 that the legacy user 402 uses for the uplink 408.

The bottom half of FIG. 4 also shows the frequency ranges of the uplink and downlink band 420 (Band 2) of the wireless standard. The new user 409 is assigned a new frequency F3 by the base station, which is within the legacy uplink frequency range for that band 420 (Band 2), on which to convey his uplink signal. Thus, the new user 409 frequency plan 418 uses one frequency from Band 1 and one frequency from Band 2. Essentially, then the new user 409 shows up as simply another legacy user in the band 420 (Band 2).

The designations of the FDD frequency bands as "uplink" and "downlink" as described herein are determined by a combination of industry standards and government regulations, which, in the U.S., is the FCC. Depending on the extent to which one implements the frequency use allocations proposed here, revisions to the appropriate industry standards and/or government regulations may be necessary. Similar revisions have been made in connection with TDD (Time Division Duplex) bands. Time Division Duplex bands are already authorized to convey both uplink and downlink signals. But in TDD bands, uplink and downlink signals are assigned different time slots. Hence to accommodate full-duplex, bands would need to be authorized for both uplink and downlink, like the present TDD bands. These bands for full-duplex would be authorized for continuous use. By "continuous" we mean without requiring time slots.

To implement the embodiment shown in FIG. 4, the base station will need to be equipped with hardware that enables full-duplex since frequency F1 is being used to transmit the downlink to the new user 409 while simultaneously receiving the uplink from the legacy user. Such hardware has been described in, for example, U.S. patent application Ser. Nos. 13/844,180 and 14/417,122, entitled "Same-Aperture Any-Frequency Simultaneous Transmit and Receive Communication", which are assigned to the present assignee. The entire contents of U.S. patent application Ser. Nos. 13/844, 180 and 14/417,122 are herein incorporated by reference.

Also, to reduce potential for interference caused by the uplink transmissions from the both the new and legacy users on the receivers of the legacy and new users, respectively, a signal suppression method can be used, such as the one described in, for example, U.S. patent application Ser. No. 14/920,740 entitled "An RF Signal Separation And Suppression System And Method", which is assigned the present assignee and which is incorporated herein by reference. This method, which can be implemented as an algorithm in software could be possibly be downloaded into the legacy user's phone. The new user's phone could have the algorithm installed at manufacture or be downloaded after manufacture.

Figure 5:
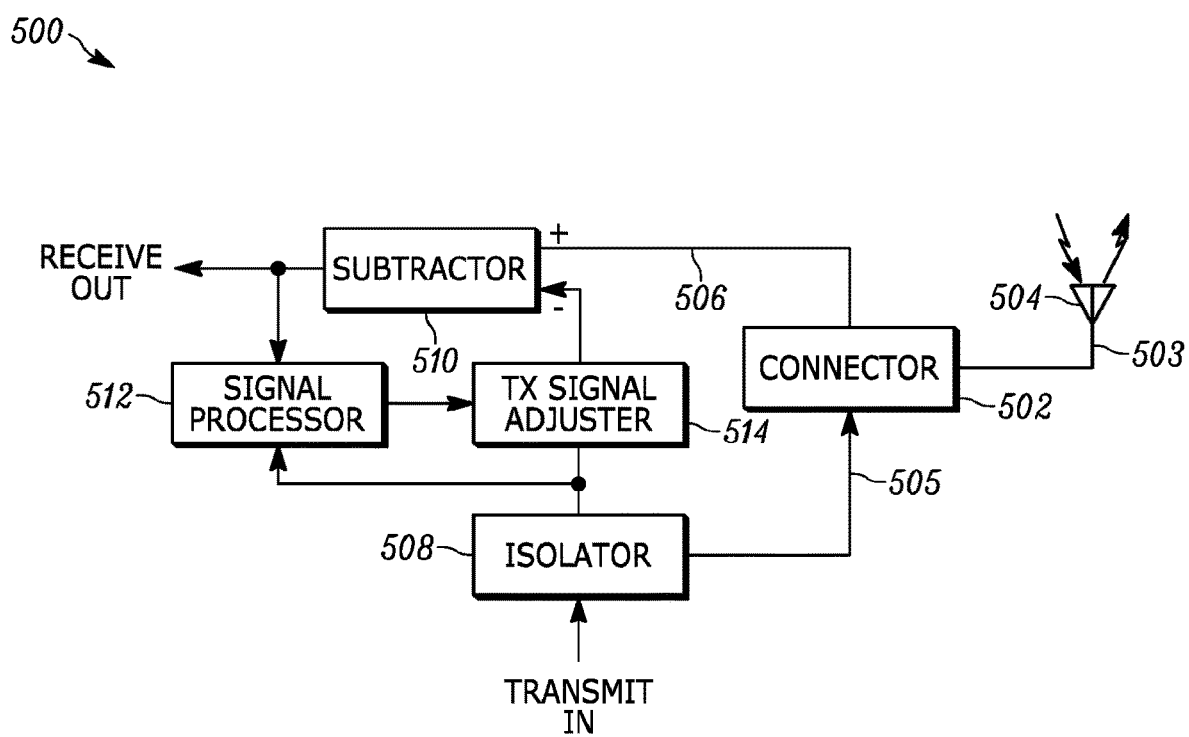
FIG. 5 illustrates a block diagram of a single-antenna, full-duplex transmit-receive system according to the present teaching.

FIG. 5 illustrates a block diagram of a single-antenna, full-duplex transmit-receive system 500 according to the present teaching. A device or system that has a transmit and/or receive capability that uses the full-duplex transmit-receive system 500 is referred to as a full-duplex device. For example, a full-duplex cell phone would be enabled with a full-duplex transmit-receive system 500.

The antenna 504 for this system would be positioned as one of potentially multiple antennas in the base station. An any-frequency connector 502 connects three signal paths, one path 503 from and to the antenna 504, one from the output of transmit path 505 and one to the input to receive path 506. The any-frequency connector 502 passes signals without any restriction to or specification of their operating frequency. An optional signal isolator 508 may be present in the transmit signal path 505. A signal differencing device or equivalently a signal subtractor 510 connects the signal isolator 508 and the signal connector 502. One input of the differencing device 510 is connected to the receive path 506.

Another input of the differencing device 510 is connected to the transmit signal path 505 that ideally has no residual receive signal. The optional isolator 508 connected to the transmit signal path 505 is designed to isolate any residual receive signal so that a clean copy of the transmit signal is applied to the differencing device 510. In operation, the differencing device 510 subtracts out the large transmit signal leaving just the receive signal.

If the transmit signal environment is sufficiently stable, it is possible to provide a transmit signal of fixed complex value to the second port of the differencing device 510. However, in many full-duplex transmit-receive systems 500, the transmit environment around the antenna 504 will change as a function of time, which in turn will cause the complex value of the transmit signal reflected by the antenna to change. A signal processor 512 determines the precise complex value of the transmit signal that should be fed to the second terminal of the differencing device 510 so as to minimize the residual transmit signal that is present in the receive path. A transmit signal adjustment circuit 514 is used to set the complex value of the transmit signal.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method of full-duplex cellular communications, the method comprising:
   a) receiving at a base station antenna a first signal transmitted by a first cellular device using a cellular uplink frequency in a cellular frequency band;
   b) transmitting a second signal from the base station antenna to the first cellular device using a cellular downlink frequency in the cellular frequency band simultaneously with the receiving the first signal transmitted by the first cellular device; and
   c) transmitting a third signal from the base station antenna to a second cellular device using the cellular uplink frequency in the cellular frequency band simultaneously with the receiving the first signal transmitted by the first cellular device and simultaneously with the transmitting the second signal from the base station antenna to the first cellular device.

2. The method of full-duplex cellular communications of claim 1 wherein the receiving the first signal transmitted by the first cellular device to the base station antenna comprises receiving the first signal using a signal generated with a frequency division duplexing (FDD) communication protocol.

3. The method of full-duplex cellular communications of claim 1 wherein the transmitting the third signal from the base station antenna to the second cellular device comprises transmitting the third signal with a frequency division duplexing (FDD) communication protocol.

4. The method of full-duplex cellular communications of claim 1 further comprising receiving a fourth signal transmitted by the second cellular device at the base station antenna using a second cellular uplink frequency in a second cellular frequency band.

5. The method of full-duplex cellular communications of claim 4 wherein the fourth signal transmitted by the second cellular device at the base station antenna using the second cellular uplink frequency in the second cellular frequency band has a frequency division duplexing (FDD) communication protocol.

6. The method of full-duplex cellular communications of claim 4 wherein the first cellular frequency band and the second cellular frequency band are different cellular frequency bands.

7. The method of full-duplex cellular communications of claim 1 wherein both the first cellular device and the second cellular device comprise a legacy cellular device.

8. The method of full-duplex cellular communications of claim 1 wherein the first cellular device comprises a legacy cellular device and the second cellular device comprises a full-duplex cellular device.

9. A full-duplex cellular base station comprising:
   a) a receiver coupled to an antenna and configured to receive a first signal transmitted by a first cellular device using a cellular uplink frequency in a cellular frequency band; and
   b) a transmitter coupled to the antenna and configured to transmit a second signal from the base station to the first cellular device using a downlink frequency in the cellular frequency band simultaneously with the receiving the first signal transmitted by the first cellular device, and configured to transmit a third signal from the base station to a second cellular device using the cellular uplink frequency in the cellular frequency band simultaneously with the receiving the first signal transmitted by the first cellular device and simultaneously with the transmitting the second signal from the base station to the first cellular device.

10. The full-duplex cellular base station of claim 9 wherein the receiver is further configured to receive a fourth signal transmitted by the second cellular device using a cellular uplink frequency in a second cellular frequency band.

11. The full-duplex cellular base station of claim 9 wherein the transmitter is configured to generate the second signal with a frequency division duplexing (FDD) communication protocol.

12. The full-duplex cellular base station of claim 9 wherein the transmitter is configured to generate the third signal with a frequency division duplexing (FDD) communication protocol.

13. The full-duplex cellular base station of claim 9 wherein the first and second cellular devices comprise legacy cellular devices.

14. The full-duplex cellular base station of claim 9 wherein the first cellular device comprises a legacy cellular device and the second cellular device comprises a full-duplex cellular device.

15. The full-duplex cellular base station of claim 9 wherein the antenna is coupled to the transmitter via an any frequency connector.

16. The full-duplex cellular base station of claim 9 wherein the antenna is coupled to both the transmitter and the receiver via an any frequency connector.

* * * * *